(12) United States Patent
Durocher et al.

(10) Patent No.: US 12,012,893 B2
(45) Date of Patent: Jun. 18, 2024

(54) LUBRICANT RESERVOIR WITH INTEGRATED HEAT EXCHANGER

(71) Applicant: Pratt & Whitney Canada Corp., Longueuil (CA)

(72) Inventors: Eric S. Durocher, Boucherville (CA); Gabriel Naccache, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/986,539

(22) Filed: Nov. 14, 2022

(65) Prior Publication Data
US 2024/0159186 A1    May 16, 2024

(51) Int. Cl.
F02C 7/14    (2006.01)
F01M 5/00    (2006.01)
F02C 7/06    (2006.01)

(52) U.S. Cl.
CPC .............. *F02C 7/06* (2013.01); *F01M 5/002* (2013.01); *F02C 7/14* (2013.01); *F05D 2220/32* (2013.01); *F05D 2260/213* (2013.01); *F05D 2260/98* (2013.01)

(58) Field of Classification Search
CPC ... F02C 7/06; F02C 7/14; F01M 5/002; F05D 2220/32; F05D 2260/231; F05D 2260/98
See application file for complete search history.

(56) References Cited

U.S. PATENT DOCUMENTS

| | | | | |
|---|---|---|---|---|
| 4,499,886 A * | 2/1985 | Hinds | ..................... | F02M 31/16 |
| | | | | 123/514 |
| 5,022,494 A * | 6/1991 | Yamakage | .............. | F28D 15/04 |
| | | | | 165/47 |
| 8,292,116 B2 * | 10/2012 | Saito | ...................... | F01M 5/002 |
| | | | | 220/563 |
| 10,578,020 B2 * | 3/2020 | Kenworthy | ............... | F02C 3/04 |
| 11,549,393 B2 * | 1/2023 | Cleyet | ..................... | F01D 25/18 |
| 11,761,344 B1 * | 9/2023 | Miller | ..................... | F01D 19/02 |
| | | | | 60/646 |
| 2009/0065171 A1 * | 3/2009 | McPherson | ............... | B61C 5/02 |
| | | | | 165/41 |
| 2009/0159246 A1 * | 6/2009 | Cornet | .................. | F28D 9/0093 |
| | | | | 165/138 |
| 2017/0122206 A1 | 5/2017 | Niergarth | | |
| 2017/0246568 A1 | 8/2017 | Sugio | | |

(Continued)

FOREIGN PATENT DOCUMENTS

JP    59175696 A    10/1984

OTHER PUBLICATIONS

EP Search Report for EP Patent Application No. 23209843.4 dated Apr. 30, 2024.

*Primary Examiner* — Michael A Riegelman
(74) *Attorney, Agent, or Firm* — Getz Balich LLC (57) ABSTRACT

An apparatus is provided for a gas turbine engine. This apparatus includes a lubricant reservoir, a heat exchanger, a lubricant circuit and a compressed air circuit. The lubricant reservoir includes an internal cavity for storing lubricant. The heat exchanger includes a heat exchange conduit and a compressed air passage. The heat exchange conduit is arranged in the internal cavity. The compressed air passage extends longitudinally through the heat exchange conduit. The lubricant circuit is fluidly coupled with the internal cavity. The compressed air circuit is fluidly coupled with the compressed air passage.

18 Claims, 8 Drawing Sheets

(56) References Cited

U.S. PATENT DOCUMENTS

2019/0390602 A1* 12/2019 Potel .......................... F02C 7/06
2020/0130534 A1* 4/2020 Julien ....................... F01P 3/12
2022/0412260 A1* 12/2022 Ellbrant .................. F01D 25/18

* cited by examiner

LUBRICANT RESERVOIR WITH INTEGRATED HEAT EXCHANGER

TECHNICAL FIELD

This disclosure relates generally to a gas turbine engine and, more particularly, to a heat exchanger for the gas turbine engine.

BACKGROUND INFORMATION

A gas turbine engine may include a heat exchanger such as a cooler for cooling various fluids such as secondary bleed air. A typical cooler is a standalone device arranged outside of a core of the gas turbine engine and mounted to an engine case via mounting brackets. While known coolers have various advantages, there is still room in the art for improvement. There is a need in the art, for example, for a cooler with a reduced impact on gas turbine engine size, weight and/or cost.

SUMMARY

According to an aspect of the present disclosure, an apparatus is provided for a gas turbine engine. This apparatus includes a lubricant reservoir, a heat exchanger, a lubricant circuit and a compressed air circuit. The lubricant reservoir includes an internal cavity for storing lubricant. The heat exchanger includes a heat exchange conduit and a compressed air passage. The heat exchange conduit is arranged in the internal cavity. The compressed air passage extends longitudinally through the heat exchange conduit. The lubricant circuit is fluidly coupled with the internal cavity. The compressed air circuit is fluidly coupled with the compressed air passage.

According to another aspect of the present disclosure, another apparatus is provided for a gas turbine engine. This apparatus includes a lubricant reservoir and a heat exchanger. The lubricant reservoir includes an internal cavity. The heat exchanger includes a heat exchange conduit and a compressed air passage. The heat exchange conduit is arranged in the internal cavity. The compressed air passage extends longitudinally through the heat exchange conduit between a passage inlet and a passage outlet. The passage inlet and the passage outlet are disposed to an exterior of the lubricant reservoir. The heat exchanger is configured to transfer heat energy between lubricant contained in the internal cavity and compressed air flowing through the compressed air passage from the passage inlet to the passage outlet.

According to still another aspect of the present disclosure, another apparatus is provided for a gas turbine engine. This apparatus includes a lubricant reservoir and a heat exchanger. The lubricant reservoir includes an internal cavity, a reservoir wall and an access panel. The reservoir wall forms an outer peripheral boundary of the internal cavity. The access panel covers a port through the reservoir wall to the internal cavity. The heat exchanger includes a heat exchange conduit and a compressed air passage. The heat exchange conduit is disposed within the internal cavity and connected to the access panel. The compressed air passage extends longitudinally through the heat exchange conduit between a passage inlet and a passage outlet. The passage inlet and the passage outlet are disposed to an exterior side of the access panel opposite the internal cavity.

The apparatus may also include an air inlet circuit and an air outlet circuit. The air inlet circuit may be fluidly coupled to the passage inlet and arranged outside of the lubricant reservoir. The air outlet circuit may be fluidly coupled to the passage outlet and arranged outside of the lubricant reservoir.

The lubricant reservoir may include a reservoir wall and an access panel. The access panel may cover a port through the reservoir wall to the internal cavity. The heat exchange conduit may be connected to the access panel.

The passage inlet and the passage outlet may be formed by the access panel.

The heat exchange conduit may be configured to transfer heat energy from the lubricant stored within the internal cavity into compressed air flowing through the compressed air passage.

The apparatus may also include a compressor section. The compressed air circuit may be configured to receive the compressed air from the compressor section and direct the compressed air into the compressed air passage.

The lubricant reservoir may include a reservoir wall and an access panel. The access panel may cover a port through the reservoir wall to the internal cavity. The heat exchanger may be connected to the access panel.

The heat exchange conduit may extend longitudinally between a conduit first end and a conduit second end. The heat exchange conduit may be connected to the access panel at the conduit first end and the conduit second end.

The compressed air passage may extend longitudinally between a passage inlet and a passage outlet. The passage inlet and the passage outlet may be disposed to a side of the access panel opposite the internal cavity.

The access panel may include an inlet fitting and an outlet fitting. The passage inlet may be fluidly coupled to the compressed air circuit and formed by the inlet fitting. The passage outlet may be formed by the outlet fitting.

The heat exchange conduit may include a plurality of conduit sections within the cavity. The conduit sections may be arranged serially between a conduit first end and a conduit second end. A first of the conduit sections may be laterally adjacent and spaced from a second of the conduit sections.

The heat exchange conduit may form a U-shaped heat exchanger loop.

The heat exchange conduit may include a plurality of conduit sections within the cavity. The conduit sections may be arranged serially between a conduit first end and a conduit second end. A first of the conduit sections may be laterally between and spaced from a second of the conduit sections and a third of the conduit sections.

The heat exchange conduit may form a W-shaped heat exchanger loop.

The heat exchange conduit may extend longitudinally along a centerline. A first section of the centerline and a second section of the centerline may each follow a straight trajectory. A third section of the centerline may follow a curved trajectory from the first section of the centerline to the second section of the centerline.

The heat exchange conduit may extend longitudinally along a centerline. At least a section of the centerline may follow a spiral trajectory.

The heat exchanger may also include a plurality of heat exchange elements projecting out from the heat exchange conduit.

A first of the heat exchange elements may include an annular fin circumscribing the heat exchange conduit.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
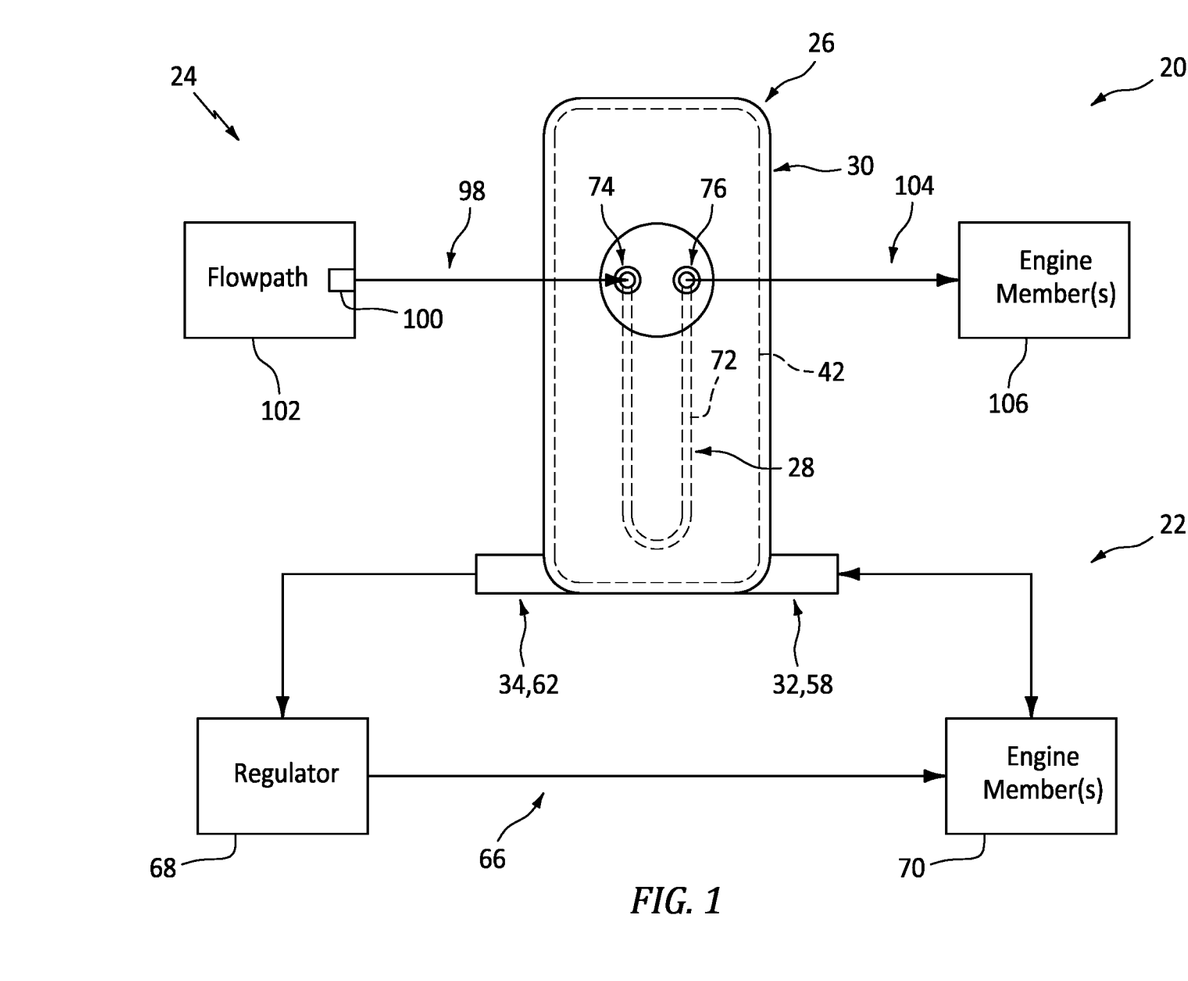
FIG. 1 is a schematic illustration of a system for a gas turbine engine.
Figure 11:
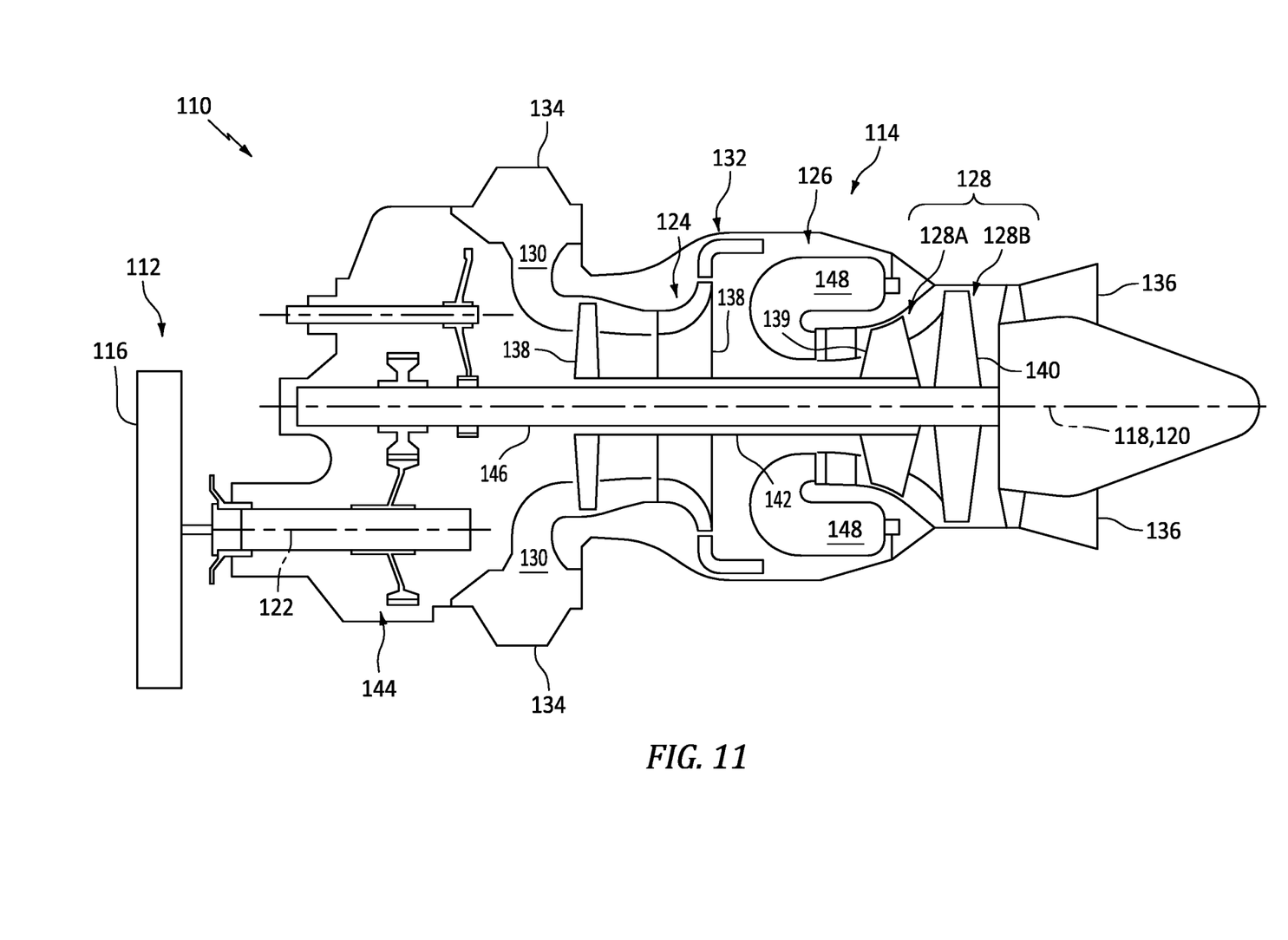
FIG. 11 is a side schematic illustration of a gas turbine engine which may include the engine system of FIG. 1.

FIG. 1 is a schematic illustration of a system 20 for a gas turbine engine; e.g., see FIG. 11. This engine system 20 includes a lubrication system 22 and an air system 24; e.g., a bleed air system, a secondary air system, a cooling air system, etc. The engine system 20, in particular, includes a lubricant reservoir 26 and a heat exchanger 28 integrated with the lubricant reservoir 26. With this arrangement, the heat exchanger 28 may transfer heat energy from relatively warm air (e.g., compressed air) flowing through the heat exchanger 28 into a quantity of relatively cool lubricant (e.g., oil) contained within the lubricant reservoir 26. Such an integrated arrangement may facilitate a reduction in engine size, engine cost, engine assembly complexity, etc. by replacing two traditionally discrete components (e.g., a lubricant reservoir and an air cooler) with a single assembly—the integrated lubricant reservoir/heat exchanger.

Figure 2:
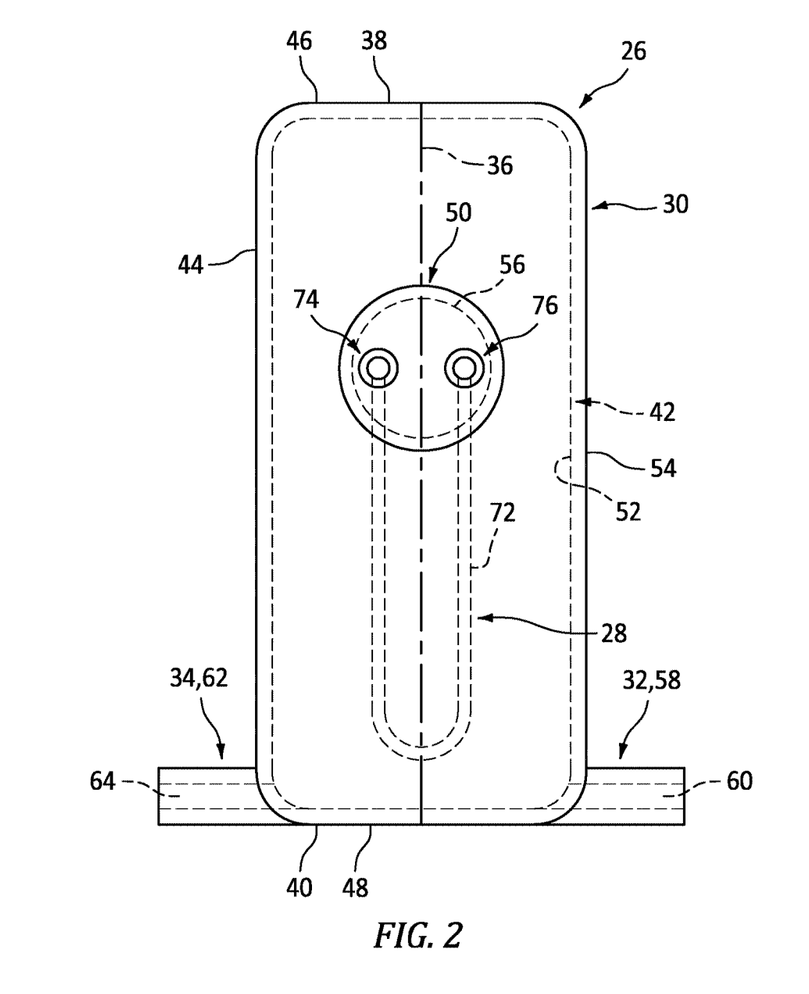
FIG. 2 is an illustration of a lubricant reservoir with an integrated heat exchanger.

Referring to FIG. 2, the lubricant reservoir 26 includes a wall structure 30, a lubricant inlet 32 and a lubricant outlet 34. The wall structure 30 extends longitudinally along a longitudinal centerline 36 of the lubricant reservoir 26 between and to a first end 38 (e.g., a top end) of the lubricant reservoir 26 and a second end 40 (e.g., a bottom end) of the lubricant reservoir 26. This wall structure 30 is configured to form a tank or other container with an enclosed internal cavity 42 for containing the lubricant. The wall structure 30, for example, includes one or more reservoir walls such as a sidewall 44, a first endwall 46 and a second endwall 48. The wall structure 30 of FIG. 2 also include an access panel 50.

The sidewall 44 of FIG. 2 extends longitudinally along the longitudinal centerline 36 between and to the first endwall 46 and the second endwall 48. The sidewall 44 extends circumferentially around the longitudinal centerline 36, thereby providing the sidewall 44 with a full-hoop (e.g., tubular) body. The sidewall 44 extends laterally between and to an inner side 52 of the wall structure 30 and an outer side 54 of the wall structure 30. The structure inner side 52 may at least partially or completely form an outer peripheral boundary of the internal cavity 42 within the lubricant reservoir 26. The sidewall 44 includes an access port 56 (e.g., a through-hole) to the internal cavity 42. This access port 56 extends through the wall structure 30 and its sidewall 44 between and to the structure inner side 52 and the structure outer side 54.

The first endwall 46 is disposed at (e.g., on, adjacent or proximate) the reservoir first end 38. The first endwall 46 is connected to (e.g., formed integral with or otherwise attached to) the sidewall 44. The first endwall 46 extends laterally between and to the structure inner side 52 and the structure outer side 54. The first endwall 46 of FIG. 2 is configured to form a first endcap of the lubricant reservoir 26 which caps (e.g., covers, seals, etc.) of a first end (e.g., a top end) of the internal cavity 42.

The second endwall 48 is disposed at the reservoir second end 40. The second endwall 48 is connected to (e.g., formed integral with or otherwise attached to) the sidewall 44. The second endwall 48 extends laterally between and to the structure inner side 52 and the structure outer side 54. The second endwall 48 of FIG. 2 is configured to form a second endcap of the lubricant reservoir 26 which caps (e.g., covers, seals, etc.) of a second end (e.g., a bottom end) of the internal cavity 42.

The access panel 50 may be configured as a removable access door, hatch and/or cover for the access port 56. The access panel 50 of FIG. 2, for example, covers the access port 56. This access panel 50 is also attached (e.g., mechanically fastened) to the wall structure 30 and its sidewall 44; e.g., by one or more fasteners. The access panel 50 may thereby plug (e.g., seal off) the access port 56 and form an outer peripheral boundary of the internal cavity 42 across the access port 56. Of course, in other embodiments, it is contemplated the access panel 50 may alternatively be bonded to the wall structure 30 and its sidewall 44 to provide a more permanent installation.

The lubricant inlet 32 may be formed by a tubular inlet fitting 58 disposed, for example, at the reservoir second end 40. The lubricant inlet 32 of FIG. 2, for example, is formed by an inlet passage 60. This inlet passage 60 projects through the inlet fitting 58 and the wall structure 30 to the internal cavity 42. Of course, in other embodiments, the lubricant inlet 32 may alternatively be configured as a port through the wall structure 30. Furthermore, it is contemplated the lubricant inlet 32 may be disposed at various other locations along the wall structure 30 besides at the reservoir second end 40.

The lubricant outlet 34 may be formed by a tubular outlet fitting 62 disposed, for example, at the reservoir second end 40. The lubricant outlet 34 of FIG. 2, for example, is formed by an outlet passage 64. This outlet passage 64 projects through the outlet fitting 62 and the wall structure 30 to the internal cavity 42. Of course, in other embodiments, the lubricant outlet 34 may alternatively be configured as a port through the wall structure 30. Furthermore, it is contemplated the lubricant outlet 34 may be disposed at various other locations along the wall structure 30 besides at the reservoir second end 40.

Referring to FIG. 1, the lubricant inlet 32 and the lubricant outlet 34 may each fluidly couple the lubricant reservoir 26 and its internal cavity 42 to a lubricant circuit 66 of the lubrication system 22; e.g., a closed loop circuit. For example, the lubricant circuit 66 of FIG. 1 includes a lubricant flow regulator 68 (e.g., a pump and/or a valve) and one or more members 70 (e.g., components, structures, etc.) of the gas turbine engine. The lubricant flow regulator 68 is configured to direct some of the lubricant contained within the lubricant reservoir 26 and its internal cavity 42 to the engine member(s) 70 for lubricating and/or cooling those engine member(s) 70. The lubricant used for lubricating and/or cooling the engine member(s) 70 may then be directed back into (e.g., returned to) the lubricant reservoir 26 and its internal cavity 42. Examples of the engine member(s) 70 include, but are not limited to, a bearing, a gear system, a seal device, another heat exchanger and an engine control accessory unit (e.g., an actuator, a propeller control unit, etc.).

Figure 3:
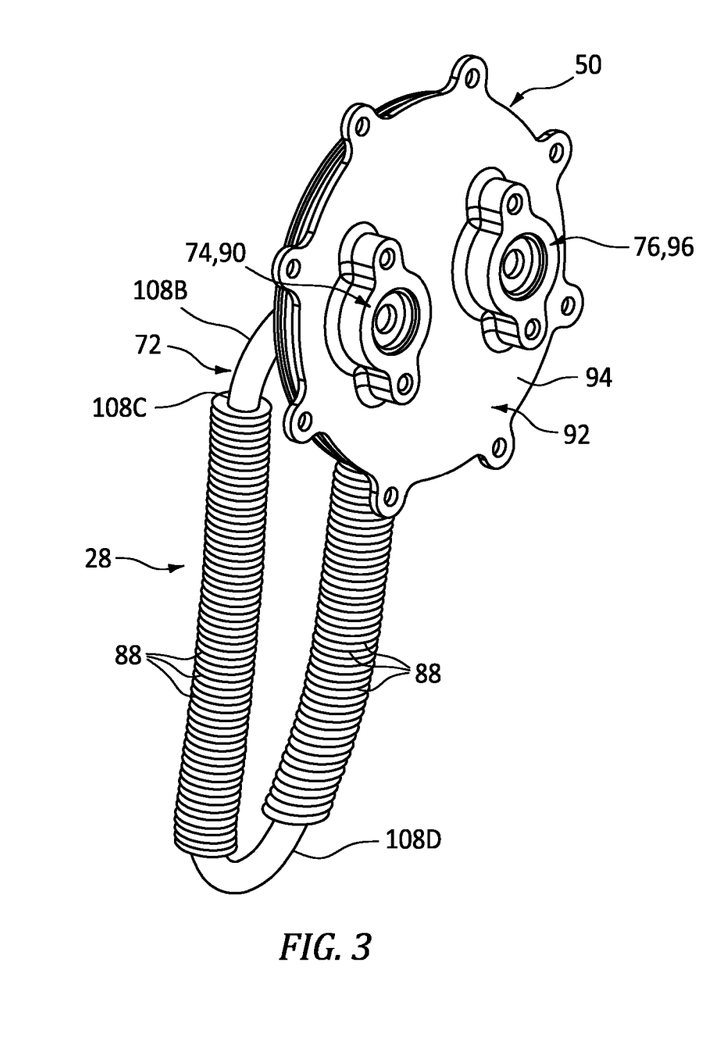
FIGS. 3 and 4 are perspective illustrations of the heat exchanger.
Figure 4:
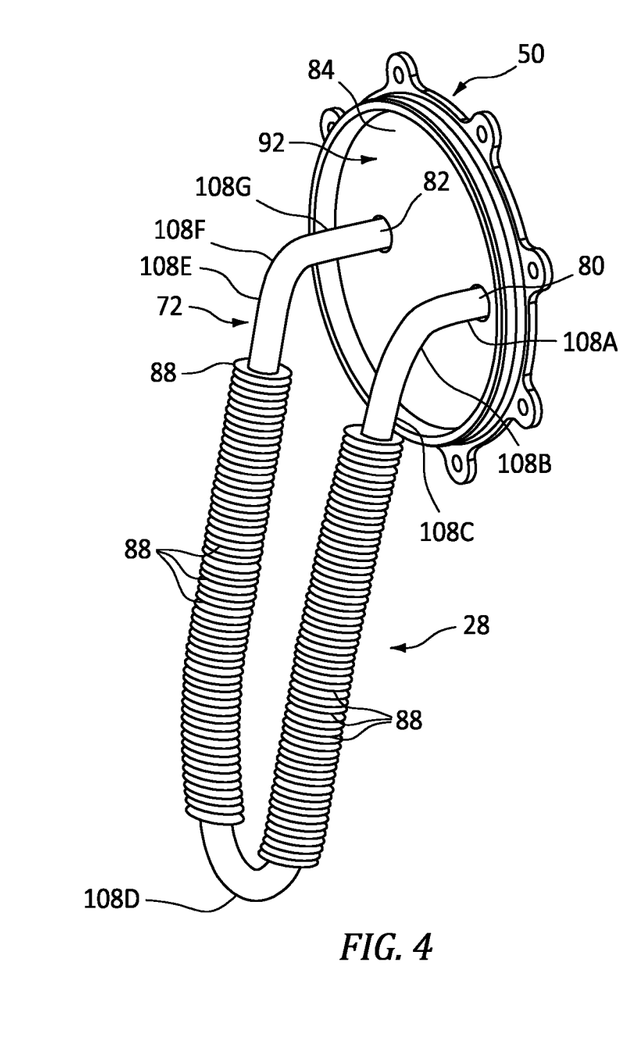

Referring to FIGS. 3 and 4, the heat exchanger 28 includes a heat exchange conduit 72, a heat exchange passage inlet 74 and a heat exchange passage outlet 76. This heat exchanger 28 also includes the access panel 50 for the lubricant reservoir 26 (see FIG. 2).

Figure 5:
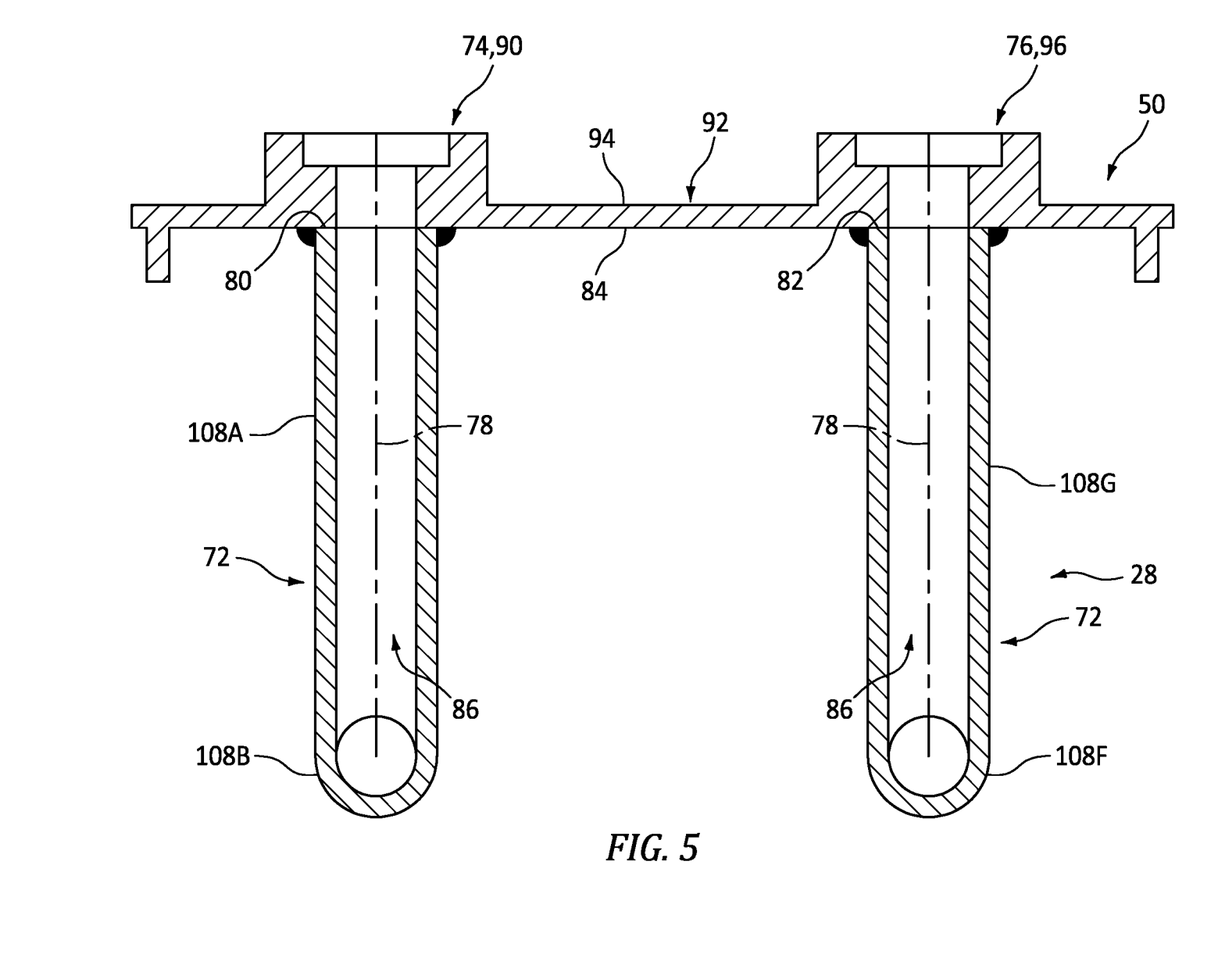
FIGS. 5 and 6 are sectional illustrations of a portion of the heat exchanger shown without heat exchange elements for ease of illustration.
Figure 6:
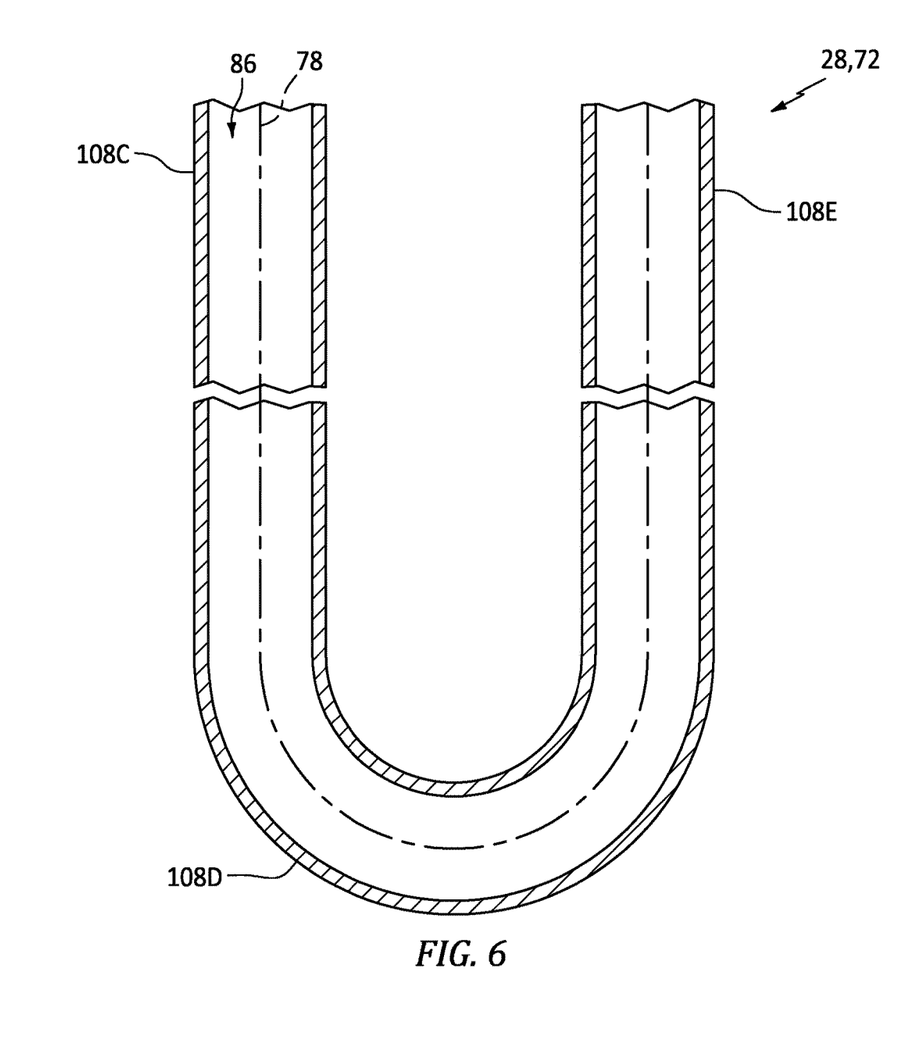

Referring to FIGS. 5 and 6, the heat exchange conduit 72 extends longitudinally along a longitudinal centerline 78 (e.g., a centerline of the heat exchange conduit 72) between and to a first end 80 of the heat exchange conduit 72 and a second end 82 of the heat exchange conduit 72. Referring to FIGS. 4 and 5, the heat exchange conduit 72 is connected to the access panel 50. The heat exchange conduit 72, for example, may be bonded (e.g., brazed, welded, etc.) to the access panel 50 at each conduit end 80, 82. Alternatively, the heat exchange conduit 72 may be mechanically fastened to the access panel 50 at one or both of the conduit ends 80, 82 using, for example, mechanical compression fittings. The connection between the heat exchange conduit 72 and the access panel 50 may be located at an interior side 84 of the access panel 50; however, the present disclosure is not limited thereto.

Referring to FIG. 2, the heat exchange conduit 72 projects longitudinally out from the access panel 50 into the internal cavity 42. The heat exchange conduit 72 may thereby extend into or be (e.g., completely) immersed within lubricant contained within the internal cavity 42.

Referring to FIGS. 5 and 6, the heat exchange conduit 72 includes an internal bore which at least partially or completely forms a heat exchange passage 86. This heat exchange passage 86 of FIGS. 5 and 6, for example, extends longitudinally along the longitudinal centerline 78 (e.g., a centerline of the heat exchange passage 86) between and to the passage inlet 74 and the passage outlet 76. An intermediate portion of the heat exchange passage 86 (e.g., formed by the heat exchange conduit 72 of FIG. 2) is disposed within the internal cavity 42. An inlet end portion of the heat exchange passage 86 of FIG. 5 extends into or through the access panel 50 to the passage inlet 74. An outlet end portion of the heat exchange passage 86 of FIG. 5 extends into or through the access panel 50 to the passage outlet 76. The heat exchanger 28 and its heat exchange passage 86 may thereby extend across the wall structure 30 of the lubricant reservoir 26; see also FIG. 2.

The heat exchange passage 86 may be a compressed air passage where the heat exchange conduit 72 and, more generally, the heat exchanger 28 are configured to flow compressed air (e.g., high pressure compressor bleed air) through the heat exchange passage 86. For example, a sidewall of the heat exchange conduit 72 may be sized and shaped to withstand (e.g., prevent) elastic deformation at operating air pressures between twenty psi and one hundred psi. The present disclosure, however, is not limited to the foregoing exemplary operating air pressures. The heat exchange conduit 72 and its sidewall may be made from various materials (e.g., depending on air conditions such as temperature and pressure) such as, but not limited to, stainless steel (ss), Inconel, titanium (Ti) or aluminum (Al).

Referring to FIGS. 3 and 4, the heat exchange conduit 72 may be configured with one or more heat exchange elements 88 (only some of which are labeled for ease of illustration). Each of these heat exchange elements 88 is connected to the heat exchange conduit 72 and disposed within the internal cavity 42 (see FIG. 2). Each heat exchange element 88 of FIGS. 3 and 4 projects laterally out from the heat exchange conduit 72. Each heat exchange element 88 may extend circumferentially about (e.g., circumscribe) the heat exchange passage 86. Each heat exchange element 88 of FIGS. 3 and 4, for example, is configured as an annular fin; e.g., a winglet style heat transfer feature. With such an arrangement, the heat exchange elements 88 effectively increase an exterior surface area of the heat exchange conduit 72 that contacts the lubricant contained within the internal cavity 42 during operation. The present disclosure, however, is not limited to such an exemplary heat exchange element arrangement. For example, in other embodiments, one or more or all of the heat exchange elements 88 may alternatively be configured as a firtree element, a point protrusion such as a pedestal, or an elongated protrusion such as a fin, a strip or another type of rail. Of course, in still other embodiments, it is contemplated the heat exchanger 28 may be configured without any of the heat exchange elements 88 where, for example, heat transfer through material of the heat exchange conduit 72 meets system requirements.

Referring to FIGS. 3 and 5, the passage inlet 74 of may be formed by a tubular inlet fitting 90. This inlet fitting 90 may be connected to (e.g., formed integral with or attached to) a base 92 of the access panel 50. The inlet fitting 90 of FIGS. 3 and 5, for example, projects out from an exterior side 94 of the panel base 92, which is opposite the panel interior side 84, to a distal end of the inlet fitting 90. The passage inlet 74 projects into or through the inlet fitting 90 to the heat exchange passage 86. Of course, in other embodiments, the passage inlet 74 may alternatively be configured as a port through the access panel 50.

The passage outlet 76 of may be formed by a tubular outlet fitting 96. This outlet fitting 96 may be connected to (e.g., formed integral with or attached to) the panel base 92. The outlet fitting 96 of FIGS. 3 and 5, for example, projects out from the exterior side 94 of the panel base 92 to a distal end of the outlet fitting 96. The passage outlet 76 projects into or through the outlet fitting 96 to the heat exchange passage 86. Of course, in other embodiments, the passage outlet 76 may alternatively be configured as a port through the access panel 50.

Referring to FIG. 1, the passage inlet 74 may fluidly couple the heat exchange passage 86 (see FIGS. 5 and 6) to a compressed inlet air circuit 98 of the air system 24. This inlet air circuit 98 is configured to provide the air (e.g., compressed air) to the heat exchanger 28 and its heat exchange passage 86 (see FIGS. 5 and 6), where the air is at a pressure multiple times above ambient pressure; e.g., 20-100 psi. The inlet air circuit 98, for example, may include a bleed device 100 (e.g., a scoop or a port) for bleeding air from a (e.g., core) flowpath 102 of the gas turbine engine. The bleed device 100, for example, may be arranged along or downstream of a compressor section of the gas turbine engine. The bleed device 100 may thereby bleed air compressed by the compressor section, and the inlet air circuit 98 may direct that bleed air into the heat exchanger 28 and its heat exchange passage 86 (see FIGS. 5 and 6) to be cooled using the lubricant within the internal cavity 42.

The passage outlet 76 may fluidly couple the heat exchange passage 86 to a compressed outlet air circuit 104 of the air system 24. This outlet air circuit 104 is configured to provide the air cooled by the heat exchanger 28 to one or more members 106 (e.g., air cooled components, structures, etc.) of the gas turbine engine. Examples of the engine member(s) 106 include, but are not limited to, a bearing compartment, a rotor, a (e.g., turbine) vane array, a (e.g., turbine) blade, a shaft, a shroud (e.g., a turbine blade shroud segment) and a (e.g., turbine) structural casing.

During operation, the internal cavity 42 of FIG. 2 may be filled with relatively cool lubricant. The heat exchanger 28 may receive relatively warm (e.g., compressed) air from the inlet air circuit 98 (see FIG. 1). This relatively warm air is directed into the heat exchange passage 86 of FIGS. 5 and 6. As the air flows through the heat exchange passage 86, heat energy is transferred from the air, through the heat exchange conduit 72, into the lubricant within the internal cavity 42 (see FIG. 2). The heat exchanger 28 of FIG. 2 is thereby operable to cool the air using the lubricant within the lubricant reservoir 26; e.g., without any additional heat exchangers outside of the lubricant reservoir 26. Referring to FIG. 1, the cooled air may then be directed from the heat exchanger 28 to the engine member(s) 106.

In some embodiments, referring to FIGS. 3-6, the heat exchange conduit 72 includes a plurality of conduit sections 108A-G (generally referred to as "108") (e.g., conduit legs) within the internal cavity 42 (see FIG. 2). These conduit sections 108A-G may be serially arranged (e.g., end-to-end) between the conduit first end 80 and the conduit second end 82. The first end section 108A projects longitudinally out from the access panel 50 to the first curved section 108B, which first curved section 108B provides a (e.g., acute, obtuse or right angle) bend between the first end section 108A and the first intermediate section 108C. The second end section 108G projects longitudinally out from the access panel 50 to the second curved section 108F, which second curved section 108F provides a (e.g., acute, obtuse or right angle) bend between the second end section 108G and the second intermediate section 108E. The first intermediate section 108C extends longitudinally from the first curved section 108B to a first end of the turnback section 108D. The second intermediate section 108E extends longitudinally from the second curved section 108F to a second end of the turnback section 108D. With this arrangement, the heat exchange conduit 72 may form or otherwise include a U-shaped and/or single pass heat exchange loop within the internal cavity 42. In other embodiments, referring to FIG. 7, the heat exchange conduit 72 may include one or more additional conduit sections 108C', 108D', 108D" and 108E'. This heat exchange conduit 72 may form or otherwise include a W-shaped and/or a multi-pass (e.g., a double pass, a triple pass, etc.) heat exchange loop within the internal cavity 42 (see FIG. 2).

Figure 7:
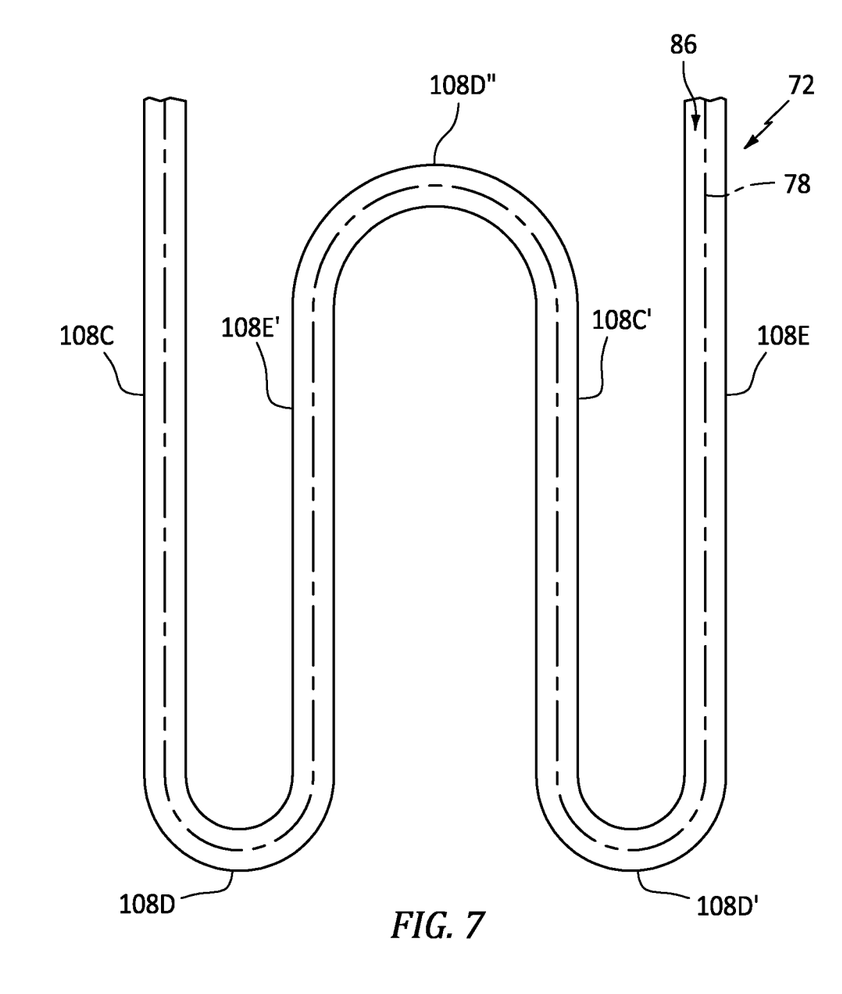
FIG. 7 is a sectional illustration of a portion of a heat exchange conduit with a W-shaped heat exchange loop.
Figure 8:
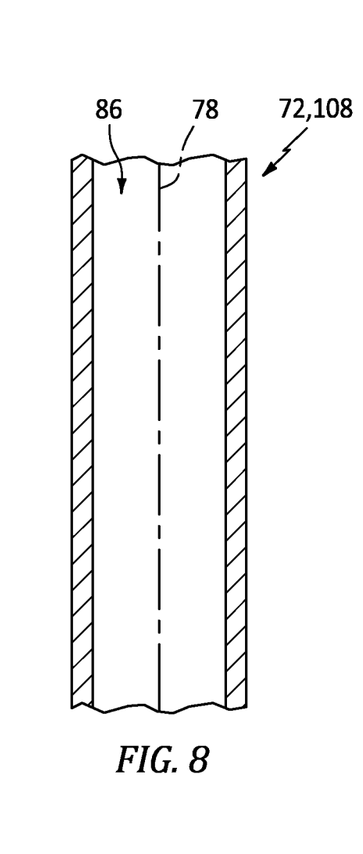
FIG. 8 is a sectional illustration of a heat exchange conduit section with a straight centerline trajectory.
Figure 9:
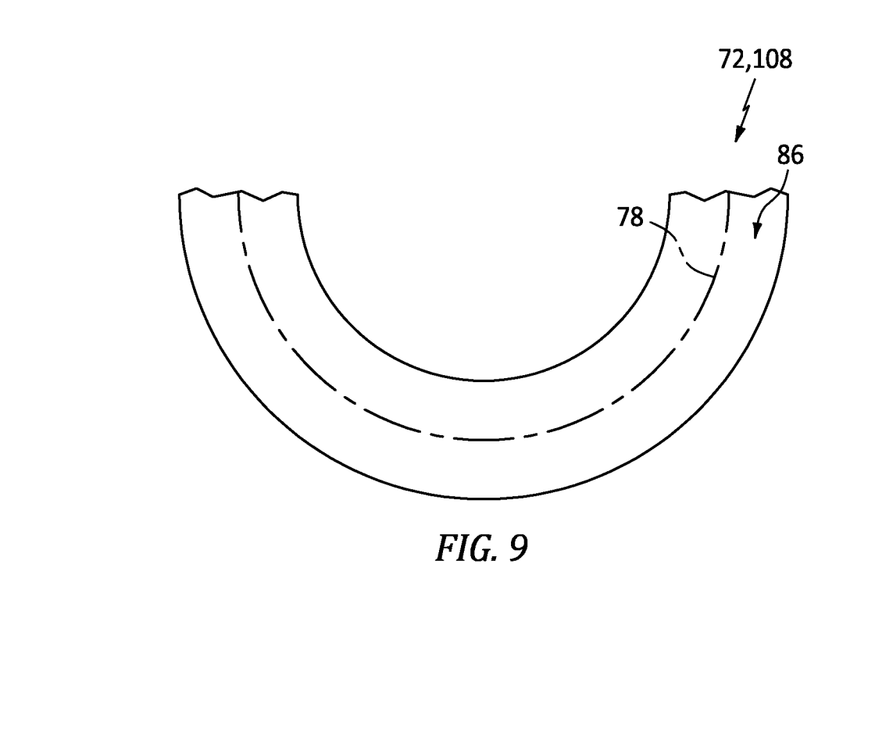
FIG. 9 is a sectional illustration of a heat exchange conduit section with a curved centerline trajectory.
Figure 10:
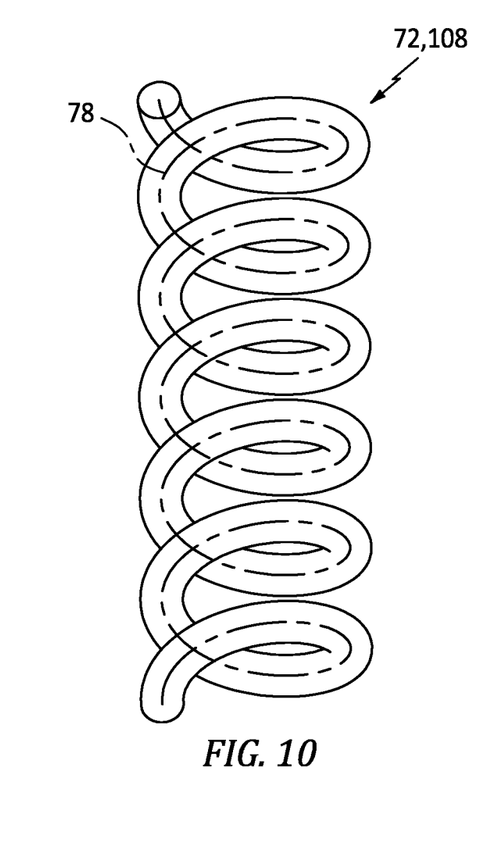
FIG. 10 is an illustration of a heat exchange conduit section with a spiral centerline trajectory.

In some embodiments, referring to FIG. 8, the longitudinal centerline 78 along any one or more of the conduit sections 108 (e.g., 108A, 108C, 108E and 108G in FIG. 4; 108C, 108C', 108E and 108E' in FIG. 7) may follow a straight trajectory. In some embodiments, referring to FIG. 9, the longitudinal centerline 78 along any one or more of the conduit sections 108 (e.g., 108B, 108D and 108F in FIG. 4; 108D, 108D' and 108D" in FIG. 7) may follow a non-straight trajectory; e.g., a curved trajectory, a splined trajectory, an arcuate trajectory, etc. In some embodiments, referring to FIG. 10, the longitudinal centerline 78 along any one or more of the conduit sections 108 (e.g., 108C and 108E in FIG. 6; 108C, 108C', 108E and 108E' in FIG. 7) may follow a spiral trajectory (another example of a non-straight trajectory).

In some embodiments, referring to FIGS. 4 and 7, a first of the conduit sections 108 (e.g., 108C in FIG. 4, 108C' in FIG. 7) may extend longitudinally along and/or overlap a second of the conduit sections 108 (e.g., 108E in FIGS. 4 and 7). This first conduit section (e.g., 108C in FIG. 4, 108C' in FIG. 7) may also or alternatively laterally neighbor (e.g., be disposed adjacent, next to, etc.) and/or be laterally spaced from the second conduit section (e.g., 108E in FIGS. 4 and 7). The first conduit section (e.g., 108C') of FIG. 7 is further laterally between and spaced from the second conduit section (e.g., 108E) and a third of the conduit sections (e.g., 108'). With such an arrangement, the conduit sections of FIGS. 4 and 7 may be parallel with one another, or angularly offset by no more than five, ten or fifteen degrees for example. The present disclosure, however, is not limited to such an exemplary arrangement.

In some embodiments, any two or more or all of the lubricant reservoir members 32, 34, 44, 46 and 48 may be formed together as a single, unitary lubricant reservoir body; e.g., a monolithic body. The lubricant reservoir members 32, 34, 44, 46 and 48, for example, may be cast, machined, additive manufactured and/or otherwise formed together as the lubricant reservoir body. Following the manufacture of the lubricant reservoir body, the access port 56 may be utilized to remove internal casting core(s) and/or un-used additive manufacturing material; e.g., unfused powder. Of course, in other embodiments, any one or more or all of the lubricant reservoir members 32, 34, 44, 46 and 48 may alternatively be discretely formed and then connected together following formation thereof.

In some embodiments, any one or more or all of the lubricant reservoir members 32, 34, 44, 46 and 48 may be formed from a first material. An example of this first material is a metal such as, but not limited to, aluminum or an aluminum alloy. Any one or more or all of the heat exchanger members 50 and/or 72, on the other hand, may be formed from a second material that is different than the first material. An example of this second material is a metal such as, but not limited to, stainless steel, copper or a copper alloy. With such a multi-material (e.g., multi-metal) construction, the first material may be selected for weight-savings and compatibility with the lubricant to be contained within the internal cavity 42, while the second material may be selected for compatibility with the relatively warm compressed air directed through the heat exchange passage 86. The present disclosure, however, is not limited to the foregoing exemplary materials nor to such a multi-material construction.

The heat exchanger 28 is generally described above as an air-to-liquid heat exchanger for cooling air. It is contemplated, however, that this integrated lubricant reservoir/heat exchanger may alternatively be used for cooling other working fluids for the gas turbine engine.

FIG. 11 illustrates a gas turbine engine 110 which may include the engine system 20 of FIG. 1. This gas turbine engine 110 includes a mechanical load 112 and a gas turbine engine core 114.

The mechanical load 112 may be configured as or otherwise include at least (or only) one driven rotor 116. This driven rotor 116 may be a bladed propulsor rotor for an aircraft propulsion system. The driven rotor 116, for example, may be a propeller rotor where the gas turbine engine 110 is configured as a turboprop gas turbine engine. The driven rotor 116 may alternatively be a helicopter rotor (e.g., a main rotor) where the gas turbine engine 110 is configured as a turboshaft gas turbine engine. The present disclosure, however, is not limited to turboprop and turboshaft gas turbine engine applications. The gas turbine engine 110, for example, may alternatively be configured as a turbofan gas turbine engine and the bladed rotor may be a fan rotor. In another example, the gas turbine engine 110 may be configured as a turbojet gas turbine engine and the bladed rotor may be a compressor rotor. Furthermore, the present disclosure is not limited to aircraft propulsion system applications. The driven rotor 116, for example, may alternatively be a generator rotor where the gas turbine engine 110 is included in a power generation system for an aircraft or non-aircraft application; e.g., an auxiliary power unit (APU) or an industrial powerplant.

The engine core 114 of FIG. 11 extends axially along an axial centerline 118 of the engine core 114. This axial centerline 118 may be coaxial with a rotational axis 120 of one or more rotors included in the engine core 114. The axial centerline 118 may also be parallel with a rotational axis 122 of the driven rotor 116. The engine core 114 of FIG. 11 includes a compressor section 124, a combustor section 126 and a turbine section 128. The turbine section 128 includes a high pressure turbine (HPT) section 128A and a low pressure turbine (LPT) section 128B.

The engine sections 124, 126, 128A and 128B are arranged sequentially along a (e.g., annular) core flowpath 130 (e.g., the flowpath 102 of FIG. 1) and within an engine housing 132. This core flowpath 130 extends longitudinally within the engine core 114 from an upstream airflow inlet 134 into the engine core 114 to a downstream airflow exhaust 136 from the engine core 114. Here, the airflow inlet 134 is also an inlet into the gas turbine engine 110 and the exhaust 136 is also an exhaust from the gas turbine engine 110; however, the present disclosure is not limited to such an exemplary arrangement. The engine housing 132 of FIG. 11 includes an engine case (e.g., a core case) housing the compressor section 124, the combustor section 126 and the turbine section 128.

The compressor section 124, the HPT section 128A and the LPT section 128B each include one or more bladed rotors 138-140. Each of these bladed rotors 138-140 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 138 is connected to and driven by the HPT rotor 139 through a high speed shaft 142. At least (or only) the compressor rotor 138, the HPT rotor 139 and the high speed shaft 142 may collectively form a high speed rotating structure that is rotatable about the rotational axis 120. The driven rotor 116 of FIG. 11 is connected to an output of a geartrain 144. An input of the geartrain 144 is connected to the LPT rotor 140 through a low speed shaft 146. At least (or only) the LPT rotor 140 and the low speed shaft 146 may collectively form a low speed rotating structure that is rotatable about the rotational axis 120. Each of the engine shafts 142, 146 is rotatably supported by a plurality of bearings (not shown in FIG. 11 for ease of illustration). Each of these bearings is connected to the engine housing 132 by an internal engine support structure.

During gas turbine engine operation, air enters the engine core 114 through the airflow inlet 134 and enters the core flowpath 130. The air within the core flowpath 130 may be referred to as "core air". This core air is compressed by the compressor rotor 138 and directed into a (e.g., annular) combustion chamber 148 of a (e.g., annular) combustor in the combustor section 126. Fuel is injected into the combustion chamber 148 through one or more fuel injectors and mixed with the compressed core air to provide a fuel-air mixture. This fuel-air mixture is ignited and combustion products thereof flow through and sequentially cause the HPT rotor 139 and the LPT rotor 140 to rotate. The rotation of the HPT rotor 139 drives rotation of the compressor rotor 138 and, thus, compression of the air received from the airflow inlet 134. The rotation of the LPT rotor 140 drives rotation of the driven rotor 116.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a gas turbine engine, comprising:
a lubricant reservoir comprising an internal cavity for storing lubricant;
a heat exchanger including a heat exchange conduit and a compressed air passage, the heat exchange conduit arranged in the internal cavity, and the compressed air passage extending longitudinally through the heat exchange conduit;
a lubricant circuit fluidly coupled with the internal cavity; and
a compressed air circuit fluidly coupled with the compressed air passage;
wherein the lubricant reservoir includes a reservoir wall and an access panel, the access panel covers a port through the reservoir wall to the internal cavity, and the heat exchanger is connected to the access panel.

2. The apparatus of claim 1, wherein the heat exchange conduit is configured to transfer heat energy from the lubricant stored within the internal cavity into compressed air flowing through the compressed air passage.

3. The apparatus of claim 1, further comprising:
a compressor section;
the compressed air circuit configured to receive the compressed air from the compressor section and direct the compressed air into the compressed air passage.

4. The apparatus of claim 1, wherein
the heat exchange conduit extends longitudinally between a conduit first end and a conduit second end; and
the heat exchange conduit is connected to the access panel at the conduit first end and the conduit second end.

5. The apparatus of claim 1, wherein
the compressed air passage extends longitudinally between a passage inlet and a passage outlet; and
the passage inlet and the passage outlet are disposed to a side of the access panel opposite the internal cavity.

6. The apparatus of claim 5, wherein
the access panel includes an inlet fitting and an outlet fitting;
the passage inlet is fluidly coupled to the compressed air circuit and formed by the inlet fitting; and
the passage outlet is formed by the outlet fitting.

7. The apparatus of claim 1, wherein
the heat exchange conduit includes a plurality of conduit sections within the cavity;
the plurality of conduit sections are arranged serially between a conduit first end and a conduit second end; and a first of the plurality of conduit sections is laterally adjacent and spaced from a second of the plurality of conduit sections.

8. The apparatus of claim 1, wherein the heat exchange conduit forms a U-shaped heat exchanger loop.

9. The apparatus of claim 1, wherein
the heat exchange conduit includes a plurality of conduit sections within the cavity;
the plurality of conduit sections are arranged serially between a conduit first end and a conduit second end; and
a first of the plurality of conduit sections is laterally between and spaced from a second of the plurality of conduit sections and a third of the plurality of conduit sections.

10. The apparatus of claim 1, wherein the heat exchange conduit forms a W-shaped heat exchanger loop.

11. The apparatus of claim 1, wherein
the heat exchange conduit extends longitudinally along a centerline;
a first section of the centerline and a second section of the centerline each follow a straight trajectory; and
a third section of the centerline follows a curved trajectory from the first section of the centerline to the second section of the centerline.

12. The apparatus of claim 1, wherein
the heat exchange conduit extends longitudinally along a centerline; and
at least a section of the centerline follows a spiral trajectory.

13. The apparatus of claim 1, wherein the heat exchanger further includes a plurality of heat exchange elements projecting out from the heat exchange conduit.

14. The apparatus of claim 13, wherein a first of the plurality of heat exchange elements comprises an annular fin circumscribing the heat exchange conduit.

15. An apparatus for a gas turbine engine, comprising:
a lubricant reservoir comprising an internal cavity; and
a heat exchanger including a heat exchange conduit and a compressed air passage, the heat exchange conduit arranged in the internal cavity, the compressed air passage extending longitudinally through the heat exchange conduit between a passage inlet and a passage outlet, the passage inlet and the passage outlet disposed to an exterior of the lubricant reservoir, and the heat exchanger configured to transfer heat energy between lubricant contained in the internal cavity and compressed air flowing through the compressed air passage from the passage inlet to the passage outlet;
wherein the lubricant reservoir includes a reservoir wall and an access panel;
wherein the access panel covers a port through the reservoir wall to the internal cavity; and
wherein the heat exchange conduit is connected to the access panel.

16. The apparatus of claim 15, wherein the passage inlet and the passage outlet are formed by the access panel.

17. An apparatus for a gas turbine engine, comprising:
a lubricant reservoir including an internal cavity, a reservoir wall and an access panel, the reservoir wall forming an outer peripheral boundary of the internal cavity, and the access panel covering a port through the reservoir wall to the internal cavity; and
a heat exchanger including a heat exchange conduit and a compressed air passage, the heat exchange conduit disposed within the internal cavity and connected to the access panel, the compressed air passage extending longitudinally through the heat exchange conduit between a passage inlet and a passage outlet, and the passage inlet and the passage outlet disposed to an exterior side of the access panel opposite the internal cavity.

18. The apparatus of claim 17, further comprising:
an air inlet circuit fluidly coupled to the passage inlet and arranged outside of the lubricant reservoir; and
an air outlet circuit fluidly coupled to the passage outlet and arranged outside of the lubricant reservoir.

* * * * *